United States Patent
Jia et al.

(10) Patent No.: US 9,774,539 B1
(45) Date of Patent: Sep. 26, 2017

(54) SYSTEMS AND METHODS FOR RECONFIGURING DATA FLOW ACROSS NETWORK CHANNELS

(71) Applicant: Symantec Corporation, Mountain View, CA (US)

(72) Inventors: Yingsong Jia, Beijing (CN); William Browning, Blaine, MN (US); Zhi Su, Beijing (CN); Shengliang Liu, Beijing (CN); Hongyu Jia, Beijing (CN)

(73) Assignee: Veritas Technologies LLC, Mountain View, CA (US)

( * ) Notice: Subject to any disclaimer, the term of this patent is extended or adjusted under 35 U.S.C. 154(b) by 179 days.

(21) Appl. No.: 14/739,685

(22) Filed: Jun. 15, 2015

(51) Int. Cl.
*G06F 15/173* (2006.01)
*H04L 12/825* (2013.01)
*H04L 29/08* (2006.01)
*H04L 12/721* (2013.01)

(52) U.S. Cl.
CPC ............ *H04L 47/26* (2013.01); *H04L 45/70* (2013.01); *H04L 67/1095* (2013.01)

(58) Field of Classification Search
None
See application file for complete search history.

(56) References Cited

U.S. PATENT DOCUMENTS 7,623,477 B2 * 11/2009 Corson ................. H04W 36/18
370/237
8,495,178 B1    7/2013 Jia et al.
2008/0159233 A1 *  7/2008 Achtari ................. H04L 45/121
370/332
2011/0267947 A1 * 11/2011 Dhar ..................... H04L 47/125
370/235
2013/0202291 A1 *  8/2013 Cavaliere ............... H04B 10/07
398/33
2013/0336167 A1 * 12/2013 Vadlakonda ............ H04L 45/04
370/255

(Continued)

OTHER PUBLICATIONS

Yingsong Jia, et al.; System and Method for Optimizing Transportation Over Networks; U.S. Appl. No. 14/524,656, filed Oct. 27, 2014.

(Continued)

*Primary Examiner* — Joshua Joo
(74) *Attorney, Agent, or Firm* — FisherBroyles LLP

(57) ABSTRACT

The disclosed computer-implemented method for reconfiguring data flow across network channels may include (1) monitoring, in a replication environment, a first network channel and a second network channel that transmit replication data, where the first network channel transmits the replication data using a first network protocol and the second network channel transmits the replication data using a second network protocol that is different than the first network protocol, (2) identifying one or more characteristics of the first and second network channels, (3) obtaining one or more performance metrics of the first and second network channels, and (4) reconfiguring data flow within the replication environment based on both the characteristics and the performance metrics of the first and second network channels. Various other methods, systems, and computer-readable media are also disclosed.

20 Claims, 7 Drawing Sheets

(56) References Cited

U.S. PATENT DOCUMENTS

2016/0119238 A1* 4/2016 Jia .................... H04L 47/12
 709/224
2017/0078190 A1* 3/2017 Huang ................ H04L 45/121

OTHER PUBLICATIONS

Dimarzio, Jerome F., "Routing 101: Routing Algorithms", http://www.informit.com/articles/article.aspx?p=27267, as accessed Mar. 25, 2015, (Jun. 21, 2002).
"Routing in Data Networks", http://web.mit.edu/dimitrib/www/Routing_Data_Nets.pdf, as accessed Mar. 25, 2015, Chapter 5, (May 30, 2009).
"LAN switching", https://en.wikipedia.org/wiki/LAN_switching, as accessed Mar. 25, 2015, Wikipedia, (Nov. 12, 2007).
"Routing", https://en.wikipedia.org/wiki/Routing, as accessed Mar. 25, 2015, Wikipedia, (Jan. 4, 2004).
"Fibre Channel", https://en.wikipedia.org/wiki/Fibre_Channel, as accessed Mar. 25, 2015, Wikipedia, (Mar. 3, 2004).
"Introduction to Fibre Channel over Ethernet (FCoE)—A Detailed Review", http://www.emc.com/collateral/hardware/white-papers/h5916-intro-to-fcoe-wp.pdf, as accessed Mar. 25, 2015, White Paper, EMC Corporation, (Apr. 2011).
"Fibre Channel over Ethernet", https://en.wikipedia.org/wiki/Fibre_Channel_over_Ethernet, as accessed Mar. 25, 2015, Wikipedia, (Dec. 6, 2008).
"Network topology", https://en.wikipedia.org/wiki/Network_topology, as accessed Mar. 25, 2015, Wikipedia, (Mar. 26, 2004).
"Difference bet netbackup master server and media server", http://www.symantec.com/connect/forums/difference-bet-netbackup-master-server-and-media-server, as accessed Mar. 25, 2015, (Dec. 29, 2007).
"Performance Measurements: Speed, Bandwidth, Throughput and Latency", http://www.tcpipguide.com/free/t_PerformanceMeasurementsSpeedBandwidthThroughputand.htm, as accessed Mar. 25, 2015, the TCP/IP Guide, (Aug. 28, 2004).
"Uptime", https://en.wikipedia.org/wiki/Uptime, as accessed Mar. 25, 2015, Wikipedia, (Dec. 29, 2003).
"Round-trip delay time", https://en.wikipedia.org/wiki/Round-trip_delay_time, as accessed Mar. 25, 2015, Wikipedia, (Jan. 27, 2004).
Rouse, Margaret "Propagation Delay Definition", http://searchnetworking.techtarget.com/definition/propagation-delay, as accessed Mar. 25, 2015, TechTarget, (Jan. 6, 2011).
"NetBackup Appliances", http://www.symantec.com/backup-appliance/, as accessed Mar. 25, 2015, Symantec Corporation, (Jan. 29, 2012).

* cited by examiner

SYSTEMS AND METHODS FOR RECONFIGURING DATA FLOW ACROSS NETWORK CHANNELS

BACKGROUND

There are many threats that organizations face when it comes to the reliability and viability of their data. Logical corruption, hardware failures, or loss of data due to viruses and software bugs can all compromise data and result in costly downtime for an organization. As a result, many organizations establish a disaster recovery plan that ensures a viable copy of data is available at all times. Disaster recovery plans often involve replicating data to an independent storage system at a remote geographic location.

Data replication may be implemented in various types of networks, including Fibre channel and Internet Protocol (IP) networks. Unfortunately, traditional replication appliances may not account for the differences in network types when optimizing replication data flow. What is needed, therefore, is a more exact and effective mechanism for managing replication data flow among different types of networks.

SUMMARY

As will be described in greater detail below, the instant disclosure describes various systems and methods for reconfiguring data flow across network channels. In one example, a computer-implemented method for reconfiguring data flow across network channels may include (1) monitoring, in a replication environment, a first network channel and a second network channel that transmit replication data, where the first network channel transmits the replication data using a first network protocol and the second network channel transmits the replication data using a second network protocol that is different than the first network protocol, (2) identifying one or more characteristics of the first and second network channels, (3) obtaining one or more performance metrics of the first and second network channels, and (4) reconfiguring data flow within the replication environment based on both the characteristics and the performance metrics of the first and second network channels. In one example, the first network channel may use a Fibre channel protocol and the second network channel use an Ethernet protocol.

In one embodiment, the method may include determining a network latency of both the first and second network channels. In this embodiment, the method may also include determining that the network latency of both the first and second network channels does not exceed a severity threshold. Alternatively, the method in this embodiment may include determining that the network latency of the first and/or second network channels exceeds a severity threshold. In embodiments where the method includes determining that the network latency of both the first and second network channels does not exceed the severity threshold, the method may also include reconfiguring data flow according to a bandwidth of at least one of the first and second network channels based on determining that the network latency of at least one of the first and second network channels does not exceed the severity threshold.

In embodiments where the method includes determining that the network latency of at least one of the first or second network channels exceeds a severity threshold, the method may include, in response to determining that the network latency of at least one of the first and second network channels exceeds the severity threshold, identifying a round-trip delay time of both the first and second network channels. In some embodiments, the method may include determining that a difference between the round-trip delay time of the first network channel and the round-trip delay time of the second network channel is less than a predetermined amount. In additional or alternative embodiments, the method may include determining that a difference between the round-trip delay time of the first network channel and the round-trip delay time of the second network channel is greater than a predetermined amount.

In embodiments where the difference between the round-trip delay time of the first network channel and the round-trip delay time of the second network channel is less than a predetermined amount, the method may further include determining that the network latency of at least one of the first or second network channels is caused by propagation based on the determination that the difference between the round-trip delay time of the first network channel and the round-trip delay time of the second network channel is less than the predetermined amount. In this embodiment, the method may further include determining, based on the identified characteristics of the first and second network channels, that (1) batching data segments transmitted using the first network channel improves network latency above a threshold amount but that (2) batching data segments transmitted using the second network channel does not improve network latency above the threshold amount. In response to (1) determining that the network latency of at least one of the first and second network channels is caused by propagation and (2) determining that batching data segments transmitted using the first network channel improves network latency above the threshold amount but that batching data segments transmitted using the second network channel does not improve network latency above the threshold amount, the method may also include reconfiguring data flow by batching data segments transmitted using the first network channel while not batching data segments transmitted using the second network channel.

In embodiments where the difference between the round-trip delay time of the first network channel and the round-trip delay time of the second network channel is greater than a predetermined amount, the method may include determining that the network latency of at least one of the first and second network channels is caused by congestion based on the determination that the difference between the round-trip delay time of the first network channel and the round-trip delay time of the second network channel is greater than the predetermined amount. In one example of this embodiment, the method may include determining that the network latency of the first network channel exceeds the severity threshold and is caused by congestion. In this example, the method may further include removing the first network channel from a list of available data replication paths in response to determining that the network latency of the first network channel is caused by congestion.

In some examples, the replication environment may replicate data using only native protocols for channels within the replication environment.

In one embodiment, a system for implementing the above-described method may include (1) a monitoring module, stored in memory, that monitors, in a replication environment, a first network channel and a second network channel that transmit replication data, where the first network channel transmits the replication data using a first network protocol and the second network channel transmits the replication data using a second network protocol that is different than the first network protocol, (2) an identification module, stored in memory, that identifies one or more characteristics of the first and second network channels, (3) an obtaining module, stored in memory, that obtains one or more performance metrics of the first and second network channels, (4) a reconfiguring module, stored in memory, that reconfigures data flow within the replication environment based on both the characteristics and the performance metrics of the first and second network channels, and (5) at least one physical processor configured to execute the monitoring module, the identification module, the obtaining module, and the reconfiguring module.

In one example, the computing system may represent a backup server that facilitates transmitting data from a source computing device to a target computing device. Additionally or alternatively, the monitoring module, the identification module, the obtaining module, and the reconfiguring module may each operate as part of a replication channel controller located on the computing system. In one embodiment, the reconfiguring module may reconfigure data flow within the replication environment by instructing a transport adapter of the computing system to reconfigure data flow between the source computing device and the target computing device. In this example, the transport adapter may, upon receiving the instructions from the reconfiguring module, transmit data using the first and second network channel in accordance with the instructions by hooking at least one data stream Application Programming Interface.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor, in a replication environment, a first network channel and a second network channel that transmit replication data, where the first network channel transmits the replication data using a first network protocol and the second network channel transmits the replication data using a second network protocol that is different than the first network protocol, (2) identify one or more characteristics of the first and second network channels, (3) obtain one or more performance metrics of the first and second network channels, and (4) reconfigure data flow within the replication environment based on both the characteristics and the performance metrics of the first and second network channels.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
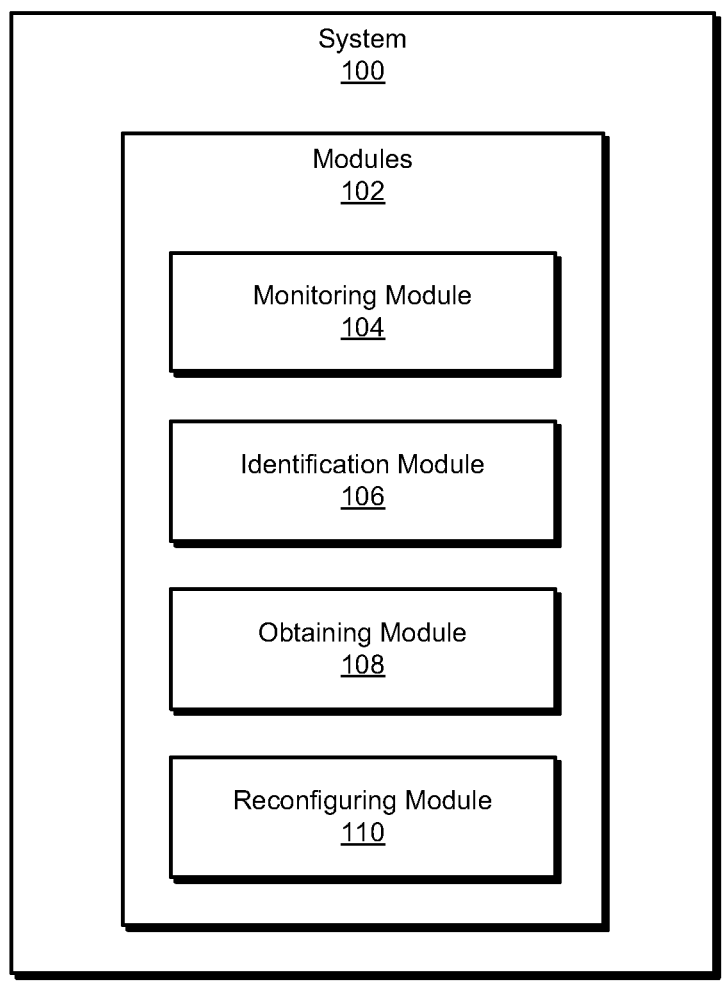
FIG. 1 is a block diagram of an exemplary system for reconfiguring data flow across network channels.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for reconfiguring data flow across network channels. As will be explained in greater detail below, the disclosed systems and methods provide software-defined replication channel control that improves replication flow in a multi-path replication environment. In some embodiments, the disclosed systems and methods may enable a replication environment to effectively identify and remedy a cause of network latency. For example, the disclosed systems and methods may facilitate determining that network latency is caused by propagation and/or congestion. Additionally or alternatively, the disclosed systems and methods may create a feedback mechanism between network channels and a replication server such that the replication server may identify characteristics of the network channels and take advantage of the identified characteristics. Thus, the disclosed systems and methods may also enable the replication environment to improve network latency that is based on both a cause of the network latency and characteristics of the network channels experiencing the network latency. By improving replication flow based on both a cause of network latency and characteristics of the network channels experiencing the network latency, the disclosed systems and methods may be able to more efficiently reduce network latency.

Figure 2:
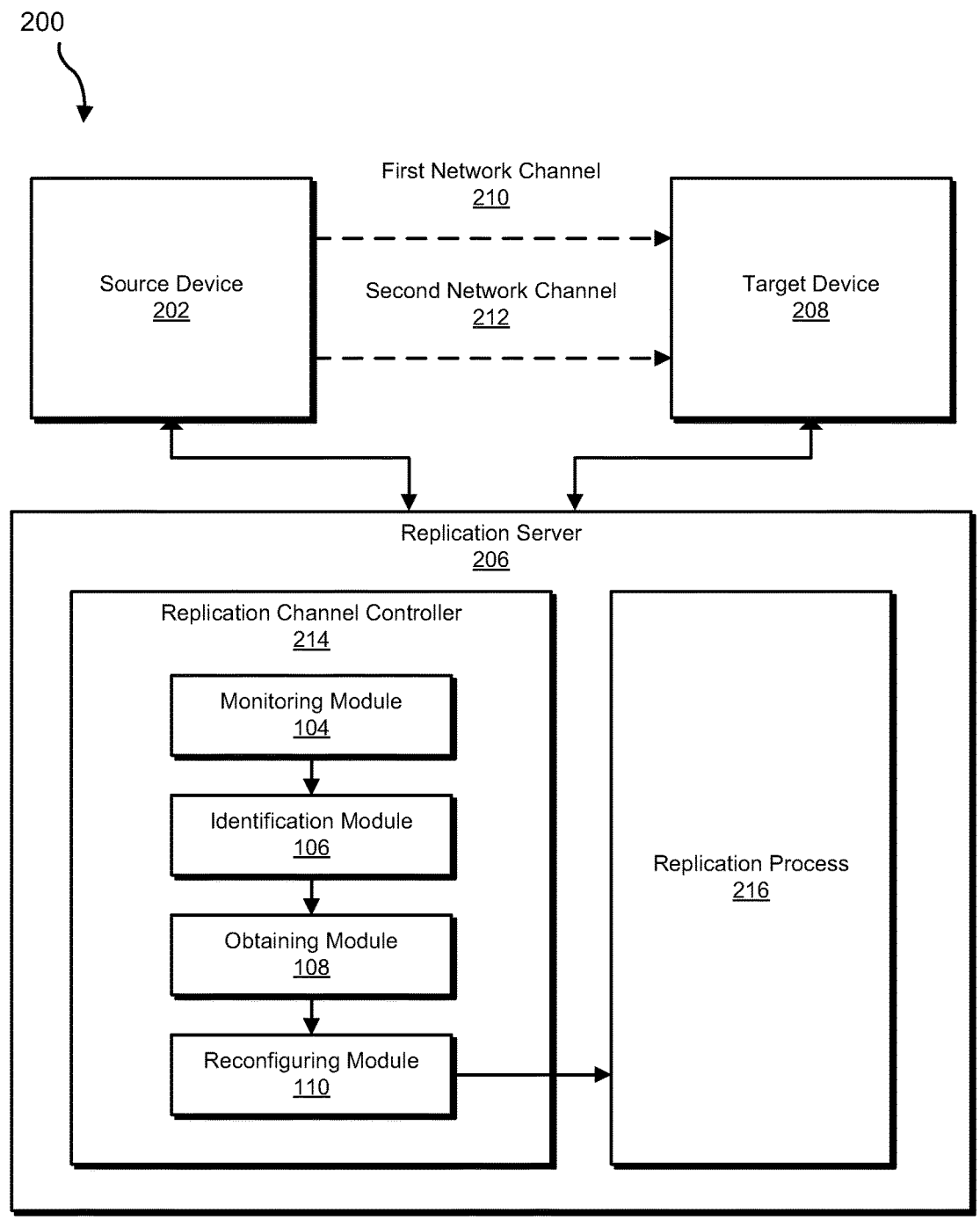
FIG. 2 is a block diagram of an additional exemplary system for reconfiguring data flow across network channels.
Figure 4:
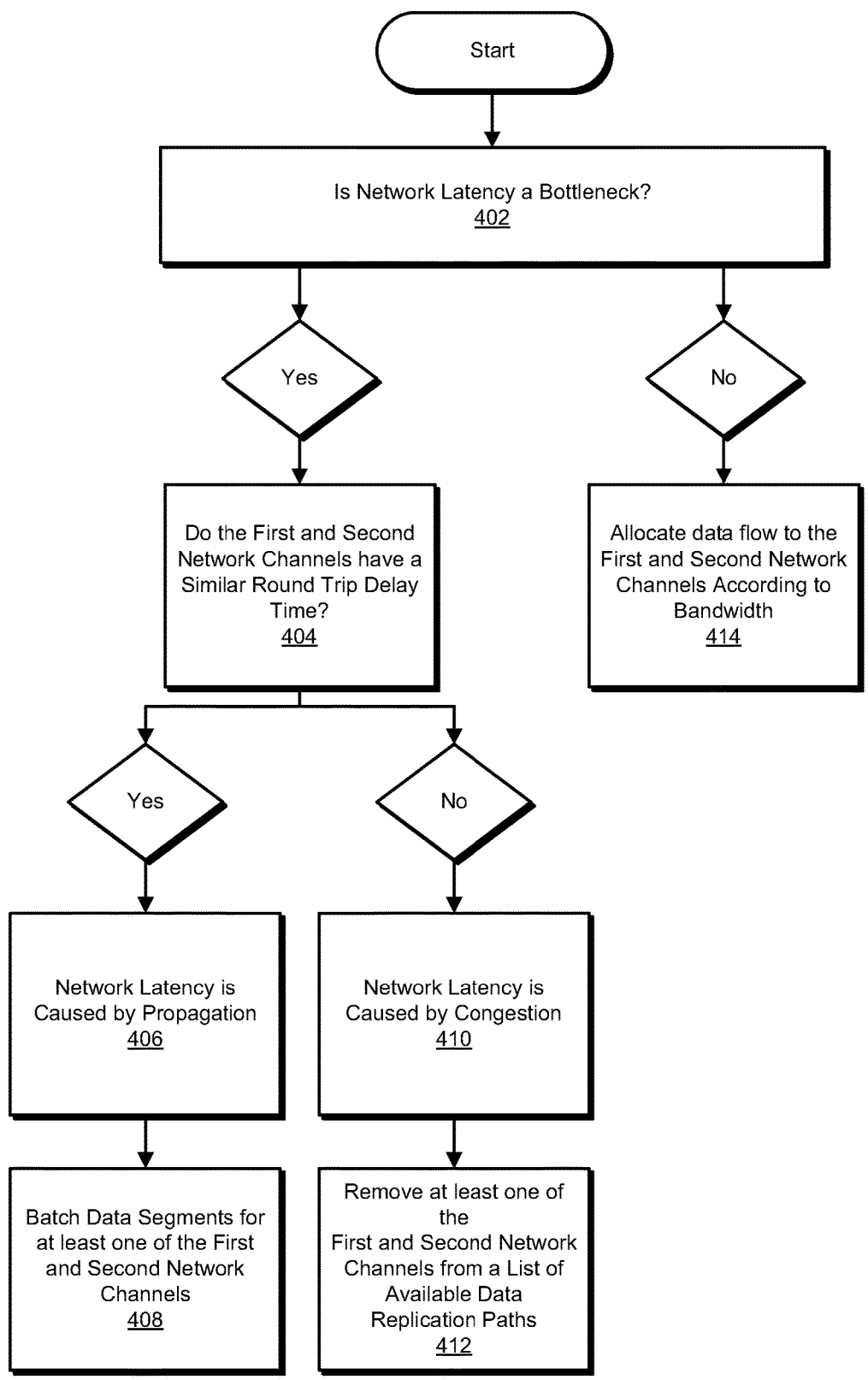
FIG. 4 is an additional flow diagram of an exemplary method for determining a cause of network latency and a remedy for network latency.
Figure 5:
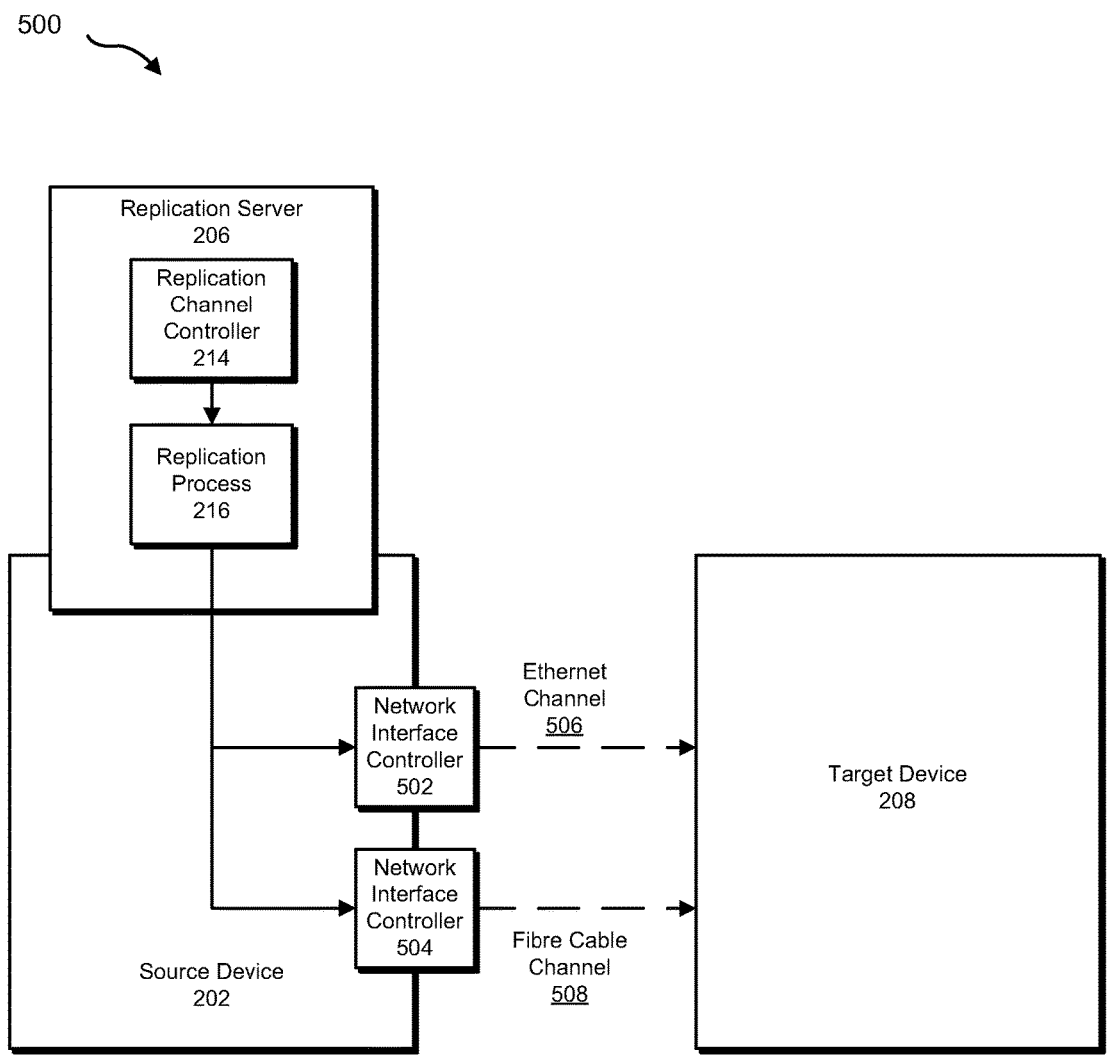
FIG. 5 is a block diagram of an additional exemplary system for reconfiguring data flow across network channels.

The following will provide, with reference to FIGS. 1, 2, and 5, detailed descriptions of exemplary systems for reconfiguring data flow across network channels. Detailed descriptions of corresponding computer-implemented methods will also be provided in connection with FIG. 3. In addition, the disclosure associated with FIG. 4 will provide examples of an exemplary method for determining a cause of network latency and selecting a remedy based on the cause. Finally, detailed descriptions of an exemplary computing system and network architecture capable of implementing one or more of the embodiments described herein will be provided in connection with FIGS. 6 and 7, respectively.

FIG. 1 is a block diagram of exemplary system 100 for reconfiguring data flow across network channels. As illustrated in this figure, exemplary system 100 may include one or more modules 102 for performing one or more tasks. For example, and as will be explained in greater detail below, exemplary system 100 may also include a monitoring module 104 that may monitor, in a replication environment, a first network channel and a second network channel that transmit replication data, where the first network channel transmits the replication data using a first network protocol and the second network channel transmits the replication data using a second network protocol that may be different than the first network protocol. Exemplary system 100 may additionally include an identification module 106 that may identify one or more characteristics of the first and second network channels. Exemplary system 100 may also include an obtaining module 108 that may obtain one or more performance metrics of the first and second network channels. Exemplary system 100 may additionally include a reconfiguring module 110 that may reconfigure data flow within the replication environment based on both the characteristics and the performance metrics of the first and second network channels. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., source device 202, target device 208, and/or replication server 206), computing system 610 in FIG. 6, and/or portions of exemplary network architecture 700 in FIG. 7. In an additional or alternative example, modules 102 may be divided across multiple servers. For example, the functionality of modules 102 may be divided among a master server and a media server in a replication environment. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary replication environment 200 in FIG. 2. As shown in FIG. 2, replication environment 200 may include a source device 202 in communication with a replication server 206 via a network. In some examples, replication environment 200 may also include a target device 208 in communication with source device 202 via a first network channel 210 and a second network channel 212. In one example, source device 202 may be programmed with one or more of modules 102. Additionally or alternatively, target device 208 may be programmed with one or more of modules 102. Additionally or alternatively, as shown in FIG. 2, a replication channel controller 214 of replication server 206 may be programmed with one or more of modules 102. As used herein, the term "replication channel controller" refers generally to a network controller that defines replication data paths dynamically based on performance bottlenecks, such as network latency or insufficient bandwidth.

In one embodiment, one or more of modules 102 from FIG. 1 may, when executed by at least one processor of source device 202, target device 208, and/or replication server 206, enable source device 202, target device 208, and/or replication server 206 to reconfigure data flow across network channels. For example, and as will be described in greater detail below, monitoring module 104 may monitor, in a replication environment, first network channel 210 and second network channel 212, where first network channel 210 transmits the replication data using a first network protocol and second network channel 212 transmits the replication data using a second network protocol that is different than the first network protocol. Identification module 106 may identify one or more characteristics of first network channel 210 and second network channel 212. Obtaining module 108 may obtain one or more performance metrics of first network channel 210 and second network channel 212. Reconfiguring module 110 may reconfigure data flow within the replication environment based on both the characteristics and the performance metrics of first network channel 210 and second network channel 212.

Source device 202 generally represents any type or form of computing device that stores source data (e.g., data that is being replicated) in a data replication environment. For example, source device 202 may be a media server (e.g., a backup server, a deduplication server, etc.) that stores data of one or more client devices. In some examples, source device 202 may represent a primary storage device of replication server 206 and target device 208 may represent a secondary, off-site storage device (e.g., a storage site that is remote from an organization's primary storage site).

Target device 208 generally represents any type or form of computing device that receives and stores replicated data in a replication environment. In some examples, target device 208 may represent a storage appliance that receives data from source device 202 via first network channel 210 and/or second network channel 212. In these examples, target device 208 may be managed by replication server 206. In some examples, target device 208 may function as part of replication server 206. Additionally or alternatively, replication server 206 may manage target device 208 remotely.

Replication server 206 generally represents any type or form of computing device that is capable of managing replication operations. Examples of replication server 206 include, without limitation, backup servers, deduplication servers, and/or any other type or form of management device within a replication environment. As a replication management device, replication server 206 may facilitate backing up, deduplicating, mirroring, or otherwise replicating data from source device 202 to target device 208.

While FIG. 2 shows that replication server 206 manages replication over two network channels between two devices, the replication management functionality described herein may be implemented in a variety of other contexts and configurations. For example, replication server 206 may manage data replication between numerous devices connected via numerous replication channels with different protocols. In some examples certain devices may be connected by network channels of a particular protocol (e.g., local devices of an organization may be connected by Ethernet channels), and other devices may be connected by network channels of another protocol (e.g., remote devices of an organization may be connected to the local devices by Fibre channels).

Figure 3:
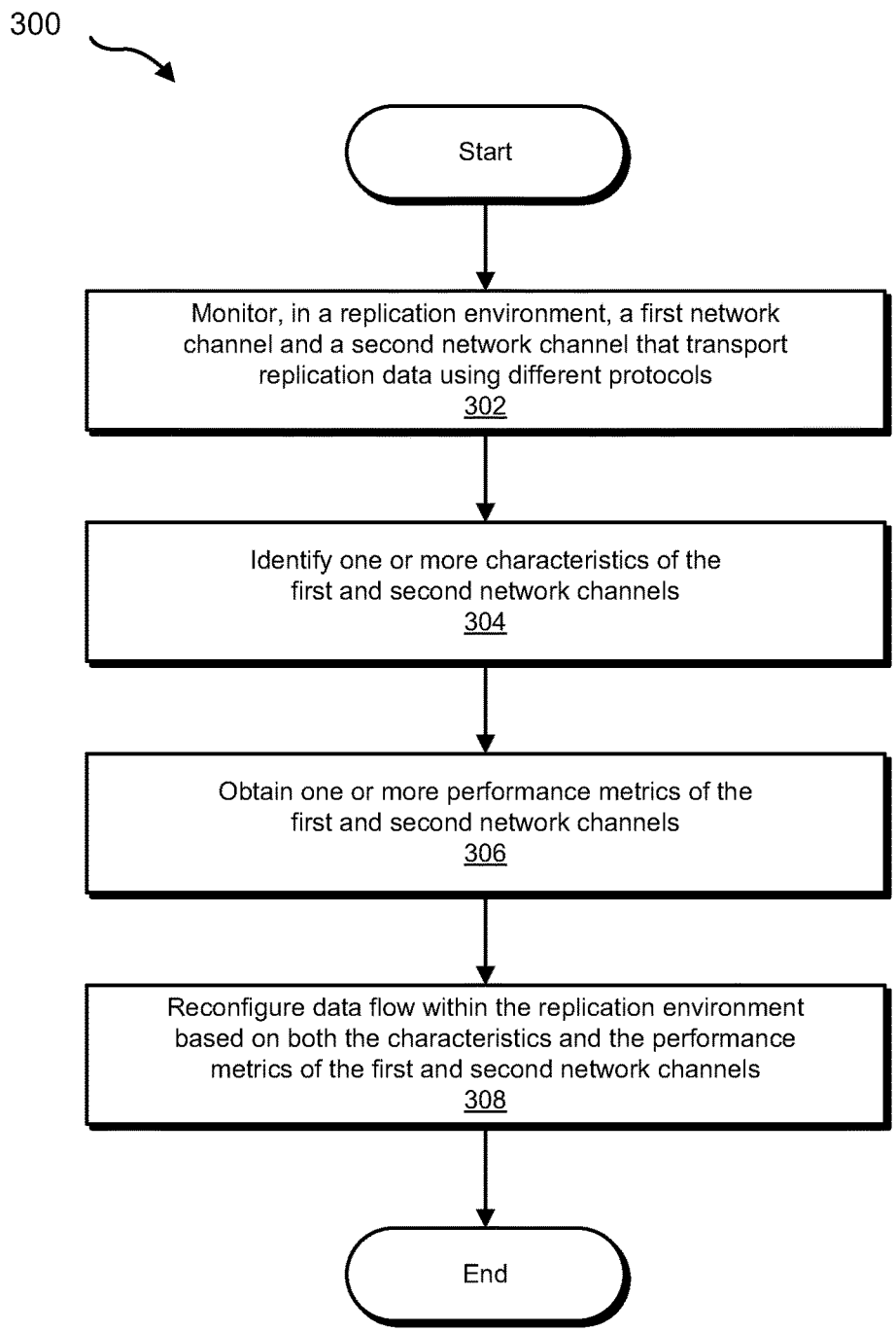
FIG. 3 is a flow diagram of an exemplary method for reconfiguring data flow across network channels.

FIG. 3 is a flow diagram of an exemplary computer-implemented method 300 for reconfiguring data flow across network channels. The steps shown in FIG. 3 may be performed by any suitable computer-executable code and/or computing system. In some embodiments, the steps shown in FIG. 3 may be performed by one or more of the components of system 100 in FIG. 1, replication environment 200 in FIG. 2, system 500 in FIG. 5, computing system 610 in FIG. 6, and/or portions of exemplary network architecture 700 in FIG. 7.

Figure 6:
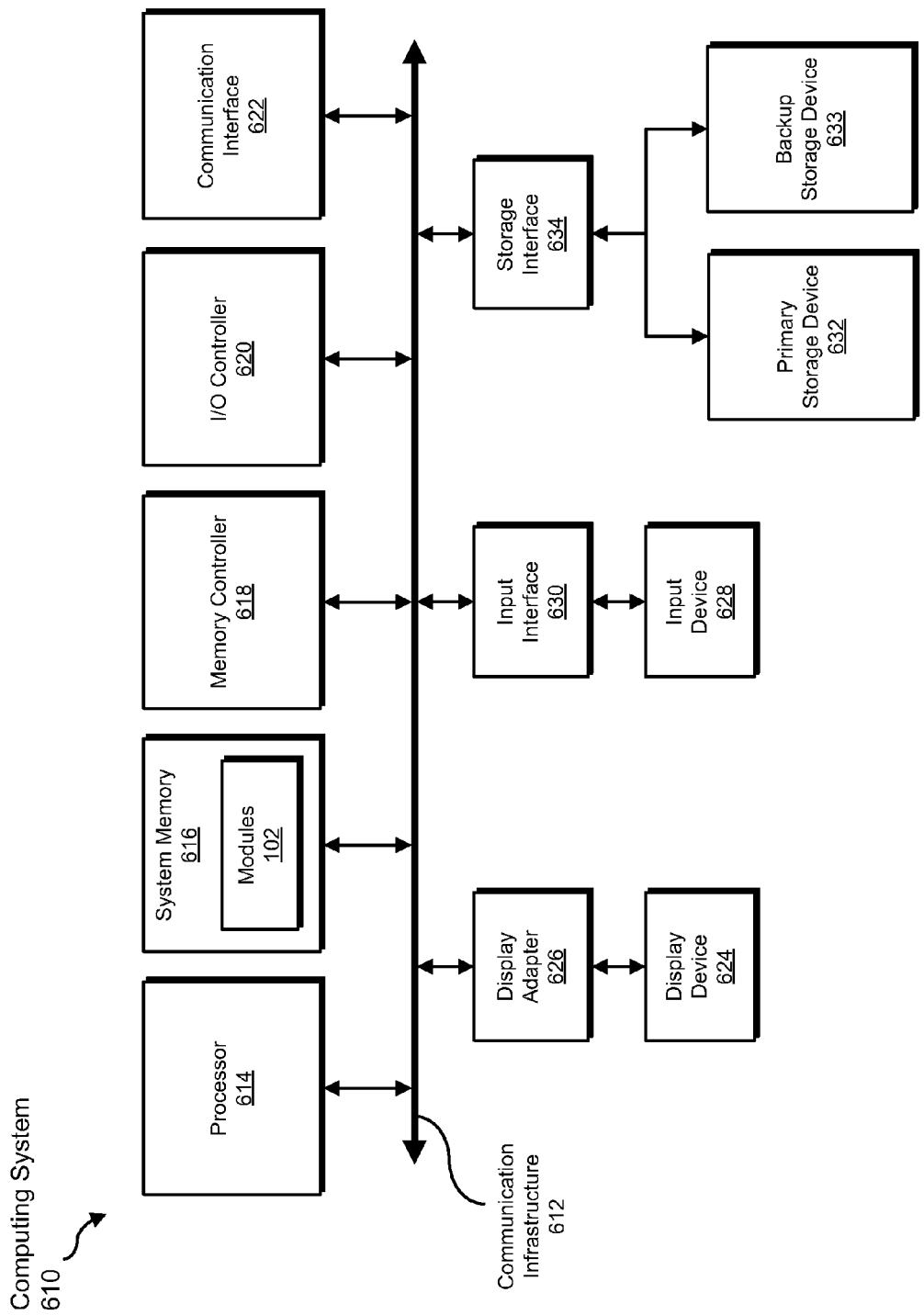
FIG. 6 is a block diagram of an exemplary computing system capable of implementing one or more of the embodiments described and/or illustrated herein.

As shown in FIG. 3, at step 302, one or more of the systems described herein may monitor, in a replication environment, a first network channel and a second network channel that transmit replication data, where the first network channel transmits the replication data using a first network protocol and the second network channel transmits the replication data using a second network protocol that is different than the first network protocol. For example, monitoring module 104 may, as part of replication server 206 in FIG. 2 and also as shown in FIGS. 5 and 6, monitor first network channel 210 and second network channel 212 that transmit replication data from source device 202 to target device 208.

As used herein, the term "replication" refers generally to any scheme for creating and/or maintaining duplicate versions of data. Replication may include, without limitation, mirroring data, deduplicating data, data backup, or any other type of data protection technology. In some examples, replication may include maintaining a data set on an independent storage system at a remote geographical location from source data.

The term "network channel," as used herein, refers generally to any transmission path used for replication. In some examples, the term "network channel" may refer to physical and/or logical properties of a data path. For example, the term "network channel" may refer to the transmission medium (e.g., Fibre or Ethernet) of a data path. Additionally or alternatively, the term "network channel" may refer to a data transmission protocol used by a data path.

Monitoring module 104 may monitor first network channel 210 and second network channel 212 in a variety of ways. In some situations, monitoring module 104 may monitor network channels 210 and 212 by identifying network channels over which data is being replicated. In this example, monitoring module 104 may monitor first network channel 210 and second network channel 212 by determining that data is being replicated over first network channel 210 and second network channel 212. Additionally or alternatively, monitoring module 104 may monitor first and second network channels 210 and 212 by monitoring a network status of first network channel 210 and second network channel 212. For example, monitoring module 104 may determine that first network channel 210 and second network channel 212 are operational and/or are actively transmitting data.

As part (or all of) performing monitoring step 302, monitoring module 104 may determine a type of channel (e.g., a protocol) for each network channel. For example, monitoring module 104 may determine that first network channel 210 is a Fibre Channel and that second network channel 212 is an Ethernet channel (e.g., a channel that implements an Internet protocol, which may also be referred to as an IP channel). As another example, monitoring module 104 may determine that first network channel 210 and/or second network channel 212 represents an InfiniBand channel.

As noted, first network channel 210 may transmit the replication data using a first network protocol and second network channel 212 may transmit the replication data using a second network protocol that is different than the first network protocol. The first and second network channels may differ in a variety of ways. In some examples, the first and second network channels may utilize different physical transmission media. For example, first network channel 210 may utilize a Fibre cable channel and second network channel 212 may utilize an Ethernet channel. The physical transmission media of first network channel 210 may have different properties than the physical transmission media of second network channel 212. For example, the reliability of the physical transmission media of first network channel 210 may be higher than the reliability of the physical transmission media of second network channel 212. As another example, first network channel 210 may be a dedicated resource used only for replication and second network channel 212 may be used for both replication and other network communication.

In some embodiments, the physical transmission media of first network channel 210 may use a different link layer protocol than the link layer protocol used by the different physical transmission media of second network channel 212. For example, as mentioned above, first network channel 210 may represent a Fibre channel (i.e., may implement a Fibre channel protocol) and second network channel 212 may represent an Ethernet channel (i.e., may implement an Ethernet protocol).

In some embodiments, the replication environment may replicate data using only native protocols for channels within the replication environment. For example, first network channel 210 may utilize a Fibre channel protocol instead of encapsulating a protocol of another channel (e.g., Fibre Channel over Ethernet (FCoE)). The disclosed systems and methods may provide efficient replication within a replication environment that includes multiple channels that use only native protocols instead of encapsulated protocols such as FCoE.

Alternatively, the disclosed systems and methods may apply to a multi-path replication environment in which each network channel within the replication environment implements the same protocol. The term "multi-path replication environment" refers generally to an environment in which data can be transmitted from a source to a destination via more than one viable path.

Returning to FIG. 3, at step 304, one or more of the systems described herein may identify one or more characteristics of the first and second network channels. For example, identification module 106 may, as part of replication server 206 in FIG. 2, identify one or more characteristics of first network channel 210 and second network channel 212. As used herein, the term "characteristic" refers generally to any static and/or inherent quality of a network channel that reflects the ability of the network channel to transmit data, how the network channel may transmit data (e.g., protocol of the network channel), and/or the efficiency with which the network channel may transmit data.

Identification module 106 may identify channel characteristics in a variety of ways. In one embodiment, identification module 106 may search a database of characteristics. For example, identification module 106 may determine that first network channel 210 is a Fibre channel and identify or search a list or database of Fibre channel characteristics to identify characteristics of first network channel 210. Similarly, identification module 106 may determine that second network channel 212 is an Ethernet channel and identify or search a list or database of Ethernet channel characteristics to identify characteristics of second network channel 212.

Additionally or alternatively, identification module 106 may identify characteristics of network channels by analyzing topology maps or other topology information associated with a replication environment. For example, identification module 106 may analyze a physical placement of first network channel 210 and/or second network channel 212, how data flows with respect to first network channel 210 and/or second network channel 212, and/or a signal type of first network channel 210 and/or second network channel

212. As another example, identification module 106 may identify the arrangement of various network elements, such as the links and/or nodes of the network. Identification module 106 may also identify a distance between network nodes and/or a physical interconnection of various network elements. As a final example, identification module 106 may identify one or more of various transmission rate parameters.

Examples of characteristics of a network channel may include, without limitation, a bandwidth limitation of the channel, a physical placement of the channel, a signal type of the channel, a physical interconnection of the channel, a maximum number of ports supported by the channel, a delivery type of the channel, a maximum packet and/or frame size for the channel, user-defined policies for the channel (e.g., policies that define what percentage of traffic on the channel can be used for replication), a topology of a network channel, and/or a batching capability of the channel. A characteristic of first network channel 210 may differ from a related characteristic of second network channel 212. In some examples, the difference may result from first network channel 210 representing a different protocol of network channel than second network channel 212. For example, as discussed above, first network channel 210 may represent a Fibre channel and second network channel 212 may represent an Ethernet channel. In this example, identification module 106 may determine that a batching data segments on the Fibre channel effectively reduces network latency caused by propagation on the Fibre channel. By contrast, identification module 106 may also determine that batching data segments on the Ethernet channel does not effectively reduce network latency caused by propagation on the Ethernet channel. As will be discussed in greater detail below, the disclosed systems and methods may more optimally reconfigure data flow by taking such differences into account.

Returning to FIG. 3, at step 306, one or more of the systems described herein may obtain one or more performance metrics of the first and second network channels. For example, obtaining module 108 may, as part of replication server 206 in FIG. 2, obtain one or more performance metrics of first network channel 210 and second network channel 212. The term "performance metric," as used herein, may refer to an indication of the current (e.g., real-time) transmission performance of a network channel.

Obtaining module 108 may obtain any of a variety of performance metrics. In one example, obtaining module 108 may obtain a latency of a network channel. As used herein the term "latency" refers generally to the current time required for data to be transmitted across a network channel from a source location to a target location. In another example, obtaining module 108 may obtain a bandwidth of a network channel. As used herein, the term "bandwidth" refers generally to the current capacity of a network channel to transport data. For example, the term "bandwidth" may refer to a maximum amount of data that a network channel is currently capable of transferring in a given amount of time (e.g., the amount of remaining capacity available on a network channel).

Another example of a performance metric may include a throughput of a network channel. As used herein, the term "throughput" refers generally to a rate of data transfer across a network channel. For example, the term "throughput" may refer to an amount of data that is currently being transferred across a network channel in a given amount of time. Another example of a performance metric may include an uptime of a network channel. As used herein, the term "uptime" refers generally to an amount or percentage of time that a network channel is operating and available. Another example of a performance metric may include a responsiveness of a network channel. As user herein, the term "responsiveness" refers to an amount of time it takes for a network channel to respond to an instruction to transmit data. Uptime and responsiveness may be used as measures of reliability or stability.

Obtaining module 108 may obtain a performance metric of first network channel 210 and second network channel 212 in a variety of ways. In some examples, obtaining module 108 may obtain a performance metric by monitoring traffic of first network channel 210 and second network channel 212. Additionally or alternatively, obtaining module 108 may obtain a performance metric using a polling protocol, such as Simple Network Management Protocol (SNMP). Additionally or alternatively, obtaining module 108 may obtain a performance metric using a ping and/or a trace route.

In addition to obtaining one or more performance metrics, obtaining module 108 may analyze any metric or other available data to identify performance metrics and/or other information about first network channel 210 and second network channel 212. For example, in addition to identifying a network latency of first network channel 210 and second network channel 212, obtaining module 108 may identify a cause of network latency in first network channel 210 and second network channel 212. In this example, once obtaining module 108 has identified the network latency of both first network channel 210 and second network channel 212, obtaining module 108 may analyze the network latency to determine whether the network latency creates a bottleneck, as shown in FIG. 4 at step 402. In some examples, obtaining module 108 may determine that a network latency creates a bottleneck if the network latency exceeds a certain severity threshold. Similarly, obtaining module 108 may determine that a network latency does not create a bottleneck if the network latency does not exceed the certain severity threshold.

In embodiments where obtaining module 108 concludes that the network latency does not create a bottleneck, obtaining module 108 may allocate data flow according to bandwidth and terminate its analysis of network latency, as shown in FIG. 4 at step 414. In embodiments where obtaining module 108 determines that the network latency creates a bottleneck, obtaining module 108 may continue to analyze the network latency. For example, obtaining module 108 may identify a round-trip delay time of first network channel 210 and a round-trip delay time of second network channel 212 to determine, based on the analysis of the round-trip delay times, whether the network latency is being caused by propagation and/or congestion.

As used herein, the term "round-trip delay time" may refer to a sum of (1) the time it takes for a signal to be transmitted from a source device to a target device and (2) the time it takes for an acknowledgement of the signal to be transmitted from the target device to the source device. The term "propagation," as used herein, may refer generally to a data transmission delay caused by one or more characteristics of a network channel. For example, the term "propagation" may refer to a data transmission delay cause by a distance between the two endpoints connected by a network channel. The term "congestion," as used herein, may refer generally to a data transmission delay cause by a network channel transmitting a larger quantity of data than the network channel is able to transmit without causing data transmission delays.

In some examples, obtaining module 108 may analyze a round-trip delay time of first network channel 210 and a round-trip delay time of second network channel 212 by comparing the two round-trip delay times, as shown in FIG. 4 at step 404. As noted above, this comparison may be used to identify a cause of network latency.

In some embodiments, after comparing the two round-trip delay times, obtaining module 108 may determine that the round-trip time of first network channel 210 and the round-trip time of second network channel 212 are similar. Two round-trip times may be similar when they are within a predetermined amount of time from one another. When round-trip times of first and second network channels 210 and 212 are similar, obtaining module 108 may conclude that the network latency of first network channel 210 and/or second network channel 212 is caused by propagation, as shown in FIG. 4 at step 406.

In alternate embodiments, after comparing the two round-trip delay times, obtaining module 108 may determine that the round trip time of first network channel 210 and the round-trip delay time of second network channel 212 are not similar. Two round-trip times may be dissimilar when they are not within a predetermined amount of time from one another. In these embodiments, obtaining module 108 may conclude that the network latency of first network channel 210 and/or second network channel 212 is caused by congestion, as shown in FIG. 4 at step 410.

Returning to FIG. 3, at step 308, one or more of the systems described herein may reconfigure data flow within the replication environment based on both the characteristics and the performance metrics of the first and second network channels. For example, reconfiguring module 110 may, as part of replication server 206 in FIG. 2, reconfigure data flow within the replication environment based on both the characteristics and the performance metrics of first network channel 210 and second network channel 212.

Reconfiguring module 110 may consider both performance metrics and channel characteristics to reconfigure data flow in a variety of ways. To give a few examples, reconfiguring module 110 may reconfigure data flow based on (1) latency metrics and intended use of a network channel, (2) performance metrics and reliability of a network channel, and (3) latency metrics and batching capabilities of a network. These will each be discussed in turn.

First, reconfiguring module 110 may reconfigure data flow based on latency of a network channel and availability characteristics of a network channel. For example, obtaining module 108 may determine whether the latency of first network channel 210 or second network channel 212 causes a bottleneck in a network. If obtaining module 108 determines that the network latency of first network channel 210 and/or second network channel 212 does not create a bottleneck, obtaining module 108 may allocate data flow to first network channel 210 and second network channel 212 based on which channel has the most available bandwidth.

Bandwidth availability may be based on current data flow metrics of the network channels and/or intended use of the network. Various types of information may be indicative of intended us of a network channel. For example, reconfiguring module 110 may use the characteristic that a network channel is a Fibre channel to infer that the network channel (e.g., network channel 210) is dedicated to replication and has 100% of all bandwidth available to replication. Similarly, reconfiguring module 110 may use the characteristic that a network channel (e.g., network channel 212) is an Ethernet channel to infer that some bandwidth (e.g., 50%) may need to be reserved for transport control information. In this example, reconfiguring module 110 may only consider 50% of the Ethernet channel bandwidth when looking at current bandwidth usage to decide which channel has more availability. As a result, even if an Ethernet channel currently has more available bandwidth than a Fibre channel, reconfiguring module 110 may move additional traffic to the Fibre channel to reserve space for other traffic on the Ethernet channel.

Another type of channel characteristic information that may be indicative of an intended use of a network channel is a rule (e.g., a user-defined or default rule) about the percentage of bandwidth that can be used for replication. For example, a user-defined rule may indicate that up to 100% of Fibre Channel bandwidth may be used for replication and up to 50% of Ethernet channel bandwidth may be used for replication. As described in the example above, reconfiguring module 110 may take these channel characteristics (i.e., percentage rules for channels) along with latency measurements into account when reconfiguring data flow within the network.

As another example, reconfiguring module 110 may determine whether to remove a congested channel from the list of available data replication paths based on a characteristic of the type of channel that the congested channel represents. For example, reconfiguring module 110 may determine that a congested network channel represents a Fibre network channel that is entirely dedicated to performing replication operations for the replication environment. In this example, reconfiguring module 110 may determine not to remove the Fibre network channel from the list, even if the Fibre network channel is congested because the Fibre network channel, though congested, continues to provide useful functionality. By contrast, if reconfiguring module 110 determines that a congested network channel represents an Ethernet network channel that is used for network traffic besides replication, reconfiguring module 110 may determine to remove the Ethernet network channel from the list to prevent the transmission of replication data from slowing down the transmission of other network data.

As mentioned previously, as a second example of considering both performance metrics and channel characteristics, reconfiguring module 110 may rely on performance metrics and reliability of network channels to manage data flow within a network. For example, obtaining module 108 may have determined that first network channel 210 is more reliable than second network channel 212 based on information and characteristics of the network channels (e.g., obtaining module 108 may determine that a topology of network channel 210 has better failover capabilities and is therefore more reliable than a topology of network channel 212). In this example, reconfiguring module 110 may consider both latency and reliability of network channels 210 and 212 when deciding how to reassign traffic flow between these network channels.

Turning to the third example of considering both performance metrics and channel characteristics, reconfiguring module 110 may reconfigure data flow based on a latency caused by propagation on a network channel and a batching capability of a network channel. For example, where obtaining module 108 determines that the network latency of first network channel 210 and/or second network channel 212 is caused by propagation, reconfiguring module 110 may look at data batching characteristics of both network channels to determine how traffic should be routed. Obtaining module 106 may have determined that a network latency caused by propagation on a Fibre channel may be significantly reduced by batching data segments that are being transmitted by the Fibre channel (i.e., a characteristic of a Fibre channel may be improved transmission efficiency for batched data segments). By contrast, identification module 106 may also have determined that a network latency caused by propagation on an Ethernet channel will not be significantly reduced by batching data segments that are being transmitted by the Ethernet channel (i.e., a characteristic of an Ethernet channel may be unimproved transmission efficiency for batched data segments). In this example, reconfiguring module 110 may reconfigure data flow based on latency metrics and a characteristic of first network channel 210 (e.g., a Fibre channel) and second network channel 212 (e.g., an Ethernet channel) by batching data segments for first network channel 210 but not batching data segments for second network channel 212, as show in FIG. 4 at step 408.

While the foregoing discussion has focused on examples of using both performance metrics and channel characteristics to manage data flow in a network, some embodiments of the instant disclosure may rely on performance metrics alone. For example, reconfiguring module 110 may reconfigure data flow based on a latency caused by congestion. When obtaining module 108 determines that the network latency of first network channel 210 and/or second network channel 212 is caused by congestion, reconfiguring module 110 may remove the network channel affected by congestion from a list of available data replication paths. To give a specific example, if obtaining module 108 determines that the network latency of first network channel 210 is caused by congestion, reconfiguring module 110 may remove first network channel 210 from the list, as shown in FIG. 4 a step 412. In this example, reconfiguring module 110 may, sometime after removing first network channel 210 from the list, determine that first network channel 210 is no longer affected by congestion. In this example, reconfiguring module 110 may add first network channel 210 back onto the list of available data replication paths upon determining that the removed network channel is no longer affected by congestion.

The steps and modules described above in connection with FIG. 3 may be implemented in a variety of environments and network configurations. For example, the steps and modules described above may be implemented in any environment that replicates a stream of data from one device to another device. As noted above, the steps and modules described above may be implemented in an all-in-one replication appliance or backup appliance, as shown in FIG. 5. In the example shown in FIG. 5, reconfiguring module 110 may, operating as part of replication channel controller 214, instruct a replication process 216 responsible for managing data within the replication environment to reconfigure data flow between first network channel 210 and second network channel 212. In some examples, replication process 216 may function as part of a transport adapter that is embedded in replication server 206 and/or source device 202. Upon receiving the instructions from reconfiguring module 110, replication process 216 may instruct a network interface controller 502 and/or a network interface controller 504 to allocate data in accordance with the instructions received from reconfiguring module 110, as shown in FIG. 5. Upon receiving the instructions from replication process 216, network interface controller 502 and/or a network interface controller 504 may use an Ethernet channel 506 and/or a Fibre channel 508 in accordance with the instructions by calling at least one data stream Application Programming Interface associated with Ethernet channel 506 and/or Fibre channel 508.

As discussed above, the disclosed systems and methods may enable a replication environment to utilize network channels more effectively. In one example, the disclosed systems and methods may identify a cause of network latency that affects replication operations. For example, the disclosed systems and methods may facilitate determining that a network latency that affects a replication operation is caused by propagation and/or congestion. In some examples, the disclosed systems and methods may also enable the replication environment to create a remedy for the network latency that is based on both a cause of the network latency and characteristics of the network channels experiencing the network latency. In a specific example, the disclosed systems and methods may improve network latency by reducing network congestion. In this specific example, the disclosed systems and methods may reduce the network congestion by reconfiguring data flow between network channels based on characteristics of the network channels. By basing a remedy on both a cause of network latency and characteristics of the network channels experiencing the network latency, the disclosed systems and methods may be able to more efficiently reduce overall network latency and/or network latency from the perspective of a replication job (e.g., latency that affects replication operations).

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
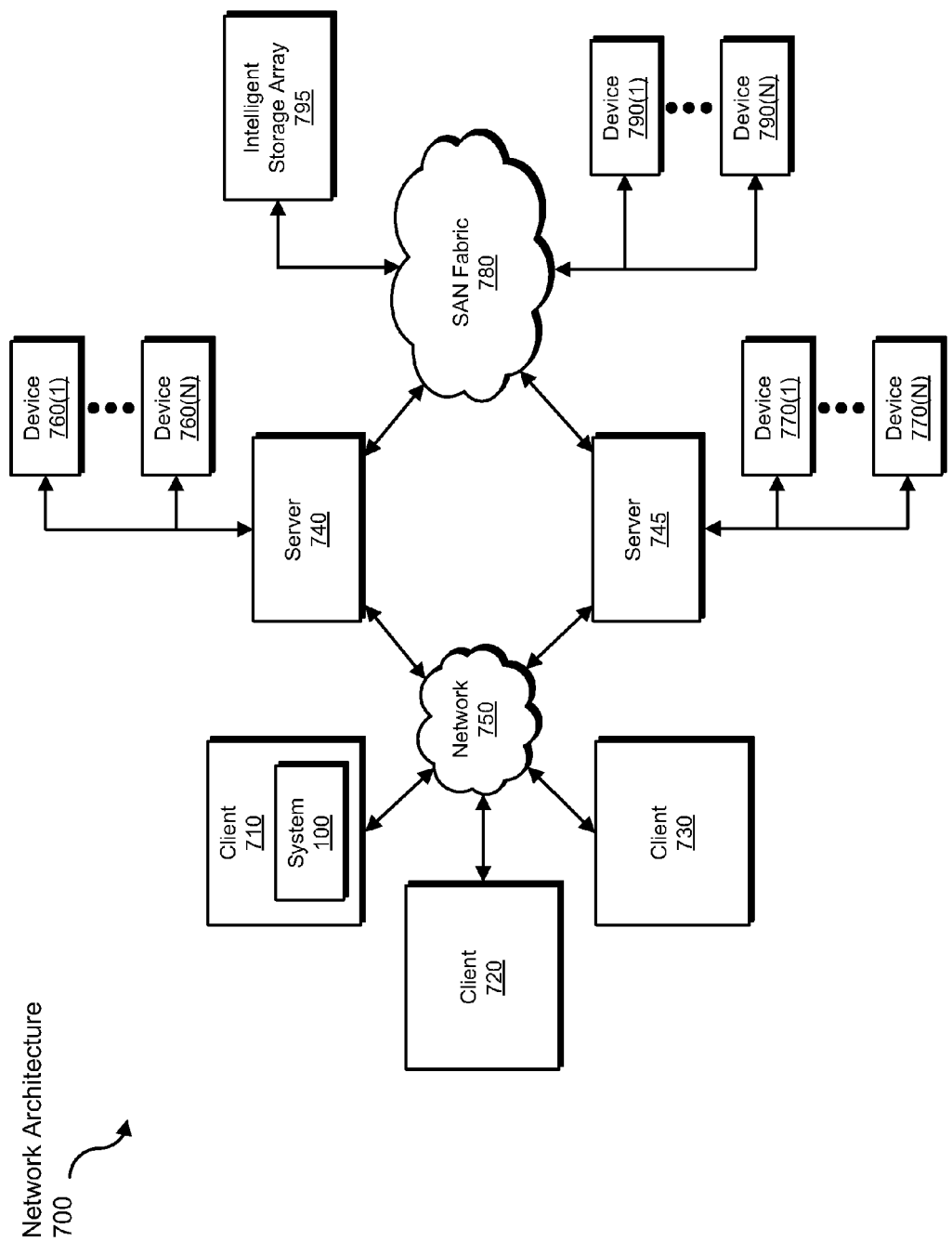
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for reconfiguring data flow across network channels.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a network by rerouting data paths of network traffic according to embodiments of the instant disclosure. Additionally or alternatively, one or more of the modules recited herein may transform a processor, volatile memory, non-volatile memory, and/or any other portion of a physical computing device from one form to another by executing one or more of the modules described herein on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for reconfiguring data flow across network channels, at least a portion of the method being performed by a computing system comprising at least one computer processor, the method comprising:
   monitoring, in a replication environment, a first network channel and a second network channel that transmit replication data, where the first network channel transmits the replication data using a first network protocol and the second network channel transmits the replication data using a second network protocol that is different than the first network protocol;
   identifying one or more characteristics of the first and second network channels;
   obtaining one or more performance metrics of the first and second network channels at least in part by determining a network latency of both the first and second network channels;
   determining that the network latency of at least one of the first and second network channels exceeds a severity threshold;
   in response to determining that the network latency of at least one of the first and second network channels exceeds the severity threshold:
      identifying a round-trip delay time of both the first and second network channels;
      determining whether a difference between the round-trip delay time of the first network channel and the round-trip delay time of the second network channel is less than a predetermined amount;
      determining whether the network latency of at least one of the first and second network channels is caused by propagation or congestion based on whether the difference between the round-trip delay time of the first network channel and the round-trip delay time of the second network channel is less than the predetermined amount;
   reconfiguring data flow within the replication environment based on both the characteristics and the performance metrics of the first and second network channels, wherein reconfiguring the data flow based on the performance metrics comprises reconfiguring the data flow based at least in part on whether the network latency is cause by propagation or congestion.

2. The computer-implemented method of claim 1, wherein:
   the first network channel uses a Fibre channel protocol;
   the second network channel uses an Ethernet protocol.

3. The computer-implemented method of claim 1, wherein at least one of the first and second network channels represents an InfiniBand channel.

4. The computer-implemented method of claim 1, wherein:
   determining whether the difference between the round-trip delay time of the first network channel and the round-trip delay time of the second network channel is less than the predetermined amount comprises determining that the difference between the round-trip delay time of the first network channel and the round-trip delay time of the second network channel is less than the predetermined amount;
   determining whether the network latency of at least one of the first and second network channels is caused by propagation or congestion comprises determining that the network latency of at least one of the first and second network channels is caused by propagation based on the determination that the difference between the round-trip delay time of the first network channel and the round-trip delay time of the second network channel is less than the predetermined amount.

5. The computer-implemented method of claim 4, further comprising:
   determining, based on the identified characteristics, that batching data segments transmitted using the first network channel improves network latency above a threshold amount but that batching data segments transmitted using the second network channel does not improve network latency above the threshold amount;
   in response to determining that the network latency of at least one of the first and second network channels is caused by propagation and determining that batching data segments transmitted using the first network channel improves network latency above the threshold amount but that batching data segments transmitted using the second network channel does not improve network latency above the threshold amount, reconfiguring data flow by batching data segments transmitted using the first network channel while not batching data segments transmitted using the second network channel.

6. The computer-implemented method of claim 1, wherein:
   determining whether the difference between the round-trip delay time of the first network channel and the round-trip delay time of the second network channel is less than the predetermined amount comprises determining that the difference between the round-trip delay time of the first network channel and the round-trip delay time of the second network channel is greater than the predetermined amount;
   determining whether the network latency of at least one of the first and second network channels is caused by propagation or congestion comprises determining that the network latency of at least one of the first and second network channels is caused by congestion based on the determination that the difference between the round-trip delay time of the first network channel and the round-trip delay time of the second network channel is greater than the predetermined amount.

7. The computer-implemented method of claim 6, wherein:
   determining that the network latency of at least one of the first and second network channels exceeds the severity threshold comprises determining that the network latency of the first network channel exceeds the severity threshold;
   determining that the network latency of at least one of the first and second network channels is caused by congestion comprises determining that the network latency of the first network channel is caused by congestion;
   the method further comprises removing the first network channel from a list of available data replication paths in response to determining that the network latency of the first network channel is caused by congestion.

8. The computer-implemented method of claim 1, further comprising:

after reconfiguring the data flow within the replication environment, monitoring the first and second network channels at a subsequent moment in time;

determining an additional network latency of both the first and second network channels at the subsequent moment in time;

determining that the additional network latency of both the first and second network channels does not exceed the severity threshold at the subsequent moment in time;

reconfiguring the data flow within the replication environment at the subsequent moment in time according to a bandwidth of at least one of the first and second network channels based on determining that the additional network latency of at least one of the first and second network channels does not exceed the severity threshold at the subsequent moment in time.

9. The computer-implemented method of claim 1, wherein the replication environment replicates data using only native protocols for channels within the replication environment.

10. A system for reconfiguring data flow across network channels, the system comprising:

a monitoring module, stored in memory, that monitors, in a replication environment, a first network channel and a second network channel that transmit replication data, where the first network channel transmits the replication data using a first network protocol and the second network channel transmits the replication data using a second network protocol that is different than the first network protocol;

an identification module, stored in memory, that identifies one or more characteristics of the first and second network channels;

an obtaining module, stored in memory, that obtains one or more performance metrics of the first and second network channels at least in part by determining a network latency of both the first and second network channels, wherein:

the obtaining module further determines that the network latency of at least one of the first and second network channels exceeds a severity threshold;

in response to determining that the network latency of at least one of the first and second network channels exceeds the severity threshold, the obtaining module:

identifies a round-trip delay time of both the first and second network channels;

determines whether a difference between the round-trip delay time of the first network channel and the round-trip delay time of the second network channel is less than a predetermined amount;

determines whether the network latency of at least one of the first and second network channels is caused by propagation or congestion based on whether the difference between the round-trip delay time of the first network channel and the round-trip delay time of the second network channel is less than the predetermined amount;

a reconfiguring module, stored in memory, that reconfigures data flow within the replication environment based on both the characteristics and the performance metrics of the first and second network channels, wherein the reconfiguring module reconfigures the data flow based on the performance metrics by reconfiguring the data flow based at least in part on whether the network latency is cause by propagation or congestion;

at least one physical processor configured to execute the monitoring module, the identification module, the obtaining module, and the reconfiguring module.

11. The system of claim 10, wherein:
the first network channel uses a Fibre channel protocol;
the second network channel use an Ethernet protocol.

12. The system of claim 10, wherein:
the replication environment is associated with a backup server that facilitates transmitting data from a source computing device to a target computing device;
the monitoring module, the identification module, the obtaining module, and the reconfiguring module operate as part of a replication channel controller;
the reconfiguring module reconfigures data flow within the replication environment by instructing a transport adapter to reconfigure data flow between the source computing device and the target computing device;
upon receiving the instructions from the reconfiguring module, the transport adapter transmits data using the first and second network channel in accordance with the instructions by hooking at least one data stream Application Programming Interface.

13. The system of claim 10, wherein at least one of the first and second network channels represents an InfiniBand channel.

14. The system of claim 10, wherein:
the obtaining module determines whether the difference between the round-trip delay time of the first network channel and the round-trip delay time of the second network channel is less than the predetermined amount by determining that the difference between the round-trip delay time of the first network channel and the round-trip delay time of the second network channel is less than the predetermined amount;
the obtaining module determines whether the network latency of at least one of the first and second network channels is caused by propagation or congestion by determining that the network latency of at least one of the first and second network channels is caused by propagation based on the determination that the difference between the round-trip delay time of the first network channel and the round-trip delay time of the second network channel is less than the predetermined amount.

15. The system of claim 14, wherein:
the reconfiguring module determines, based on the identified characteristics, that batching data segments transmitted using the first network channel improves network latency above a threshold amount but that batching data segments transmitted using the second network channel does not improve network latency above the threshold amount;
in response to determining that the network latency of at least one of the first and second network channels is caused by propagation and determining that batching data segments transmitted using the first network channel improves network latency above the threshold amount but that batching data segments transmitted using the second network channel does not improve network latency above the threshold amount, the reconfiguring module reconfigures data flow by batching data segments transmitted using the first network channel while not batching data segments transmitted using the second network channel.

16. The system of claim 10, wherein:
the obtaining module determines whether the difference between the round-trip delay time of the first network channel and the round-trip delay time of the second network channel is less than the predetermined amount by determining that the difference between the round-trip delay time of the first network channel and the round-trip delay time of the second network channel is greater than the predetermined amount;

the obtaining module determines whether the network latency of at least one of the first and second network channels is caused by propagation or congestion by determining that the network latency of at least one of the first and second network channels is caused by congestion based on the determination that the difference between the round-trip delay time of the first network channel and the round-trip delay time of the second network channel is greater than the predetermined amount.

17. The system of claim 16, wherein:

the obtaining module determines that the network latency of at least one of the first and second network channels exceeds the severity threshold by determining that the network latency of the first network channel exceeds the severity threshold;

the obtaining module determines that the network latency of at least one of the first and second network channels is caused by congestion by determining that the network latency of the first network channel is caused by congestion;

the reconfiguring module removes the first network channel from a list of available data replication paths in response to the determination that the network latency of the first network channel is caused by congestion.

18. The system of claim 10, wherein:

the first network channel represents a dedicated resource used only for replication;

the second network channel represents a resource used for both replication and other network communication.

19. A non-transitory computer-readable medium comprising one or more computer-readable instructions that, when executed by at least one processor of a computing device, cause the computing device to:

monitor, in a replication environment, a first network channel and a second network channel that transmit replication data, where the first network channel transmits the replication data using a first network protocol and the second network channel transmits the replication data using a second network protocol that is different than the first network protocol;

identify one or more characteristics of the first and second network channels;

obtain one or more performance metrics of the first and second network channels at least in part by determining a network latency of both the first and second network channels;

determine that the network latency of at least one of the first and second network channels exceeds a severity threshold;

in response to determining that the network latency of at least one of the first and second network channels exceeds the severity threshold:

identifying a round-trip delay time of both the first and second network channels;

determining whether a difference between the round-trip delay time of the first network channel and the round-trip delay time of the second network channel is less than a predetermined amount;

determining whether the network latency of at least one of the first and second network channels is caused by propagation or congestion based on whether the difference between the round-trip delay time of the first network channel and the round-trip delay time of the second network channel is less than the predetermined amount;

reconfigure data flow within the replication environment based on both the characteristics and the performance metrics of the first and second network channels, wherein reconfiguring the data flow based on the performance metrics comprises reconfiguring the data flow based at least in part on whether the network latency is cause by propagation or congestion.

20. The non-transitory computer-readable medium of claim 19, wherein:

the first network channel comprises a Fibre channel;

the second network channel comprises an Ethernet channel;

the replication environment implements both a Fibre Channel Protocol and an Ethernet Channel Protocol without using Fibre Channel over Ethernet.

* * * * *